(12) United States Patent
Kikkawa et al.

(10) Patent No.: US 6,967,969 B2
(45) Date of Patent: Nov. 22, 2005

(54) MULTIPLEX COMMUNICATION SYSTEM CAPABLE OF ACTIVATING DESTINATION NETWORK BEFOREHAND

(75) Inventors: Hajime Kikkawa, Nagoya (JP); Tomohisa Kishigami, Obu (JP); Jiro Sato, Kariya (JP); Shinichi Senoo, Kariya (JP)

(73) Assignee: Denso Corporation, Kariya (JP)

( * ) Notice: Subject to any disclaimer, the term of this patent is extended or adjusted under 35 U.S.C. 154(b) by 847 days.

(21) Appl. No.: 09/877,028

(22) Filed: Jun. 11, 2001

(65) Prior Publication Data

US 2002/0006139 A1    Jan. 17, 2002

(30) Foreign Application Priority Data

Jul. 13, 2000  (JP)  ............................. 2000-212217

(51) Int. Cl.⁷ .......................................... H04L 12/403
(52) U.S. Cl. ...................................... 370/451; 370/462
(58) Field of Search ............................... 370/401, 449, 370/451, 452, 462, 445, 447, 910

(56) References Cited

U.S. PATENT DOCUMENTS 4,779,092 A   10/1988  Takao
5,343,470 A    8/1994  Hideshima et al.

FOREIGN PATENT DOCUMENTS

| JP | A-H4-63744 | 2/1992 |
|---|---|---|
| JP | A-4-310444 | 11/1992 |
| JP | A-7-327044 | 12/1992 |
| JP | A-2000-138717 | 5/2000 |

*Primary Examiner*—Chau Nguyen
*Assistant Examiner*—Zewdu Habte
(74) *Attorney, Agent, or Firm*—Posz Law Group, PLC

(57) ABSTRACT

A multiplex communication system includes a plurality of networks and a data relay unit. When an event occurs in a node belonging to one of the networks, the node (sender node) sends a wake-up frame before it sends an event frame. In response to the wake-up frame, the nodes belonging to the same network which includes the sender node are activated and the data relay unit sends a wake-up frame to the respective networks for activating the networks. When it is determined that each of the networks is activated, the data relay unit sends a network activation notifying (NAN) frame regarding the network to all the networks. The NAN frame regarding the network represents that the network is activated. The sender node sends the event frame in response to the NAN frame regarding the destination network of the event frame.

8 Claims, 9 Drawing Sheets

MULTIPLEX COMMUNICATION SYSTEM CAPABLE OF ACTIVATING DESTINATION NETWORK BEFOREHAND

CROSS REFERENCE TO RELATED APPLICATION

The present application relates to and incorporates herein by reference Japanese Patent Application No. 2000-212217 filed on Jul. 13, 2000.

BACKGROUND OF THE INVENTION

1. Field of the Invention

The present invention relates to a multiplex communication system and more particularly to a method for controlling data relay among networks in the multiplex communication system when an event for data communication occurs.

2. Related Art

In recent years, sophistication of communication networks advances in various fields as computer technology advances. In the field of motor vehicles, the volume of information exchanged among control sections (ECUs) which control respective electrical components installed on a vehicle increases rapidly. Therefore a multiplex communication system is employed for communication among the control sections in the vehicle so that the number of wire harnesses required for the communication is reduced.

In the multiplex communication system, nodes such as ECUs or the like are connected to a common multiplex communication line and communicate each other by exchanging data frames through the common communication line. In the vehicle, a plurality of networks are formed for efficient data communication between the control sections. All nodes are appropriately divided into the networks according to the required communication speed or the like. Communication between two nodes belonging to different networks is performed via a data relay unit.

When a trigger such as an event for data communication is generated in one of the nodes, a data frame (wake-up frame) which represents that the network to which the node belongs should be activated is sent over the communication line in the network. In response to this, each of the other nodes in the network is activated and sends a wake-up frame over the communication line. In this way, by receiving a wake-up frame, each node recognizes that the event occurs in one of the other nodes in the network, and, by sending the wake-up frame, notifies the other nodes that the node is activated. If an event does not occur for a predetermined time in the network, the network (i.e., all nodes in the network) shifts into a sleep mode for minimizing power consumption.

When an event is generated in a node, the node notifies the occurrence of the event to predetermined destination nodes by generating a notice of occurrence of the event (event frame). The data relay unit receives the event frame and relays the event frame to the destination node. However, if the destination node belongs to a network which is in the sleep mode, it cannot receive the event frame. Therefore, in the case that the event frame is sent only once, the destination node often does not receive the event frame after all. When some type of event such as door-locking or door-opening in keyless entry occurs, the event frame is sent only once.

In U.S. Pat. No. 5,343,470, event frames are periodically sent many times in response to occurrence of an event so that destination node can certainly receive the event frame.

However, the destination nodes cannot necessarily receive the event frame even if the event frames are periodically sent many times. Further, traffic congestion in data communication may occur when many events occur at the same time. Moreover, certain time elapses from occurrence of the event until the destination node recognizes the occurrence of the event, resulting in delay. This delay varies greatly depending on the state of the system at the moment of the occurrence of the event.

The data relay unit may save the event frame in a buffer until the network which includes the destination node is activated. However, in this case, a high-capacity buffer is required so that the data relay unit operates effectively, and therefore cost is high.

SUMMARY OF THE INVENTION

The present invention has an object to provide a multiplex communication system in which notice of occurrence of an event is sent to a destination node after the destination network is activated so that the destination node certainly receives the notice of occurrence of the event.

A multiplex communication system according to the present invention includes a plurality of networks and a data relay unit. Each of the networks is formed by connecting a plurality of nodes to a communication line. The data relay unit relays data frames among the networks. When an event occurs in one of the nodes, the node sends a notice of occurrence of the event to a destination node belonging to the other networks via the data relay unit. However, the node (sender node) sends to the data relay unit a request to send a predetermined response before it sends the notice of occurrence of the event. The data relay unit includes an activation request sending (ARS) section, an activation state determination (ASD) section, and an activation state answering (ASA) section. The ARS section sends to at least the destination network of the notice of occurrence of the event an activation request which requests the network to be activated. The ASD section determines whether the networks to which the activation request is sent are activated. The ASA section sends the predetermined response to at least the network to which the sender node belongs if the ASD section determines that the networks to which the activation request is sent are activated. In response to the predetermined response, the sender node sends the notice of occurrence of the event. In this way, the notice of occurrence of the event is sent to the destination nodes after the destination network is activated. Therefore the destination node can certainly receive the notice of occurrence of the event.

Preferably, the sender node sends a data frame which requests the network which includes the sender node to be activated as the request to send the predetermined response. In this case, in response to the request, the ARS section sends the activation request to not only the network which includes the sender node but also the other networks. In this case, the sender node is not required to send a data frame which includes the destination network of the notice of occurrence of the event as the request to send the predetermined response. Accordingly, the data relay unit can be simplified because the data relay unit is not required to execute the special program for the time of occurrence of an event.

BRIEF DESCRIPTION OF THE DRAWINGS

The invention, together with additional objects, features, and advantages thereof, will be best understood from the following description, the appended claims and the accompanying drawings in which:

DETAILED DESCRIPTION OF THE PREFERRED EMBODIMENT

The present invention will be described with reference to embodiments and modifications.

(First Embodiment)

Figure 1:
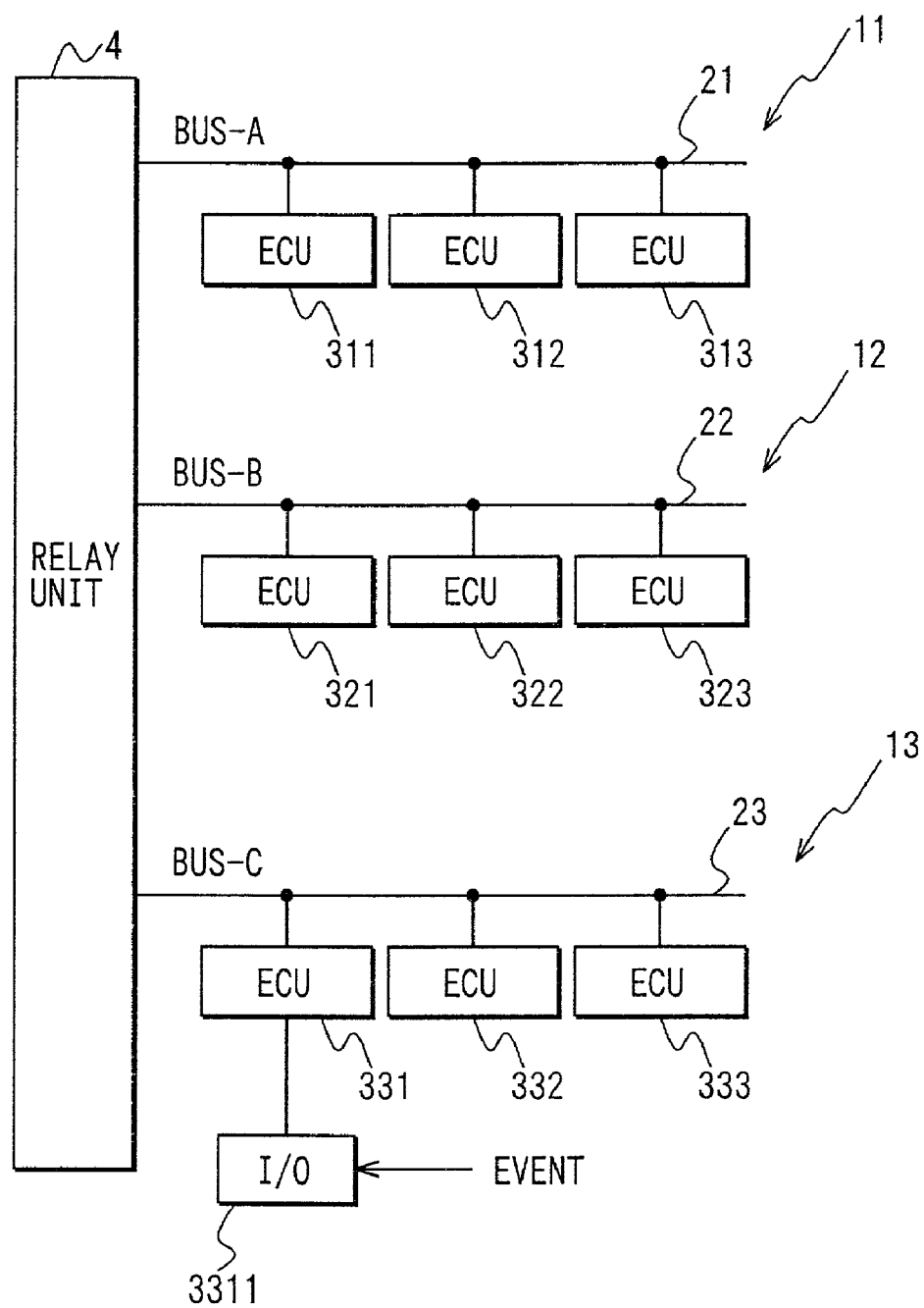
FIG. 1 is a block diagram of a multiplex communication system according to a first embodiment of the present invention.

Referring to FIG. 1, a multiplex communication system includes a plurality of networks 11–13 and a data relay unit 4. If the multiplex communication system is used for communication among the ECUs in a vehicle, the networks 11–13 are an audio system network, a body system network, or the like. The audio system network includes ECUs for an audio unit or a navigation unit as nodes. The body system network includes ECUs for an engine or an air-conditioner as nodes.

Each network 11–13 is formed by connecting at least one node (ECU) 311–313, 321–323, 331–333 to a corresponding multiplex communication line 21–23. Data communication among the nodes 321, 322 within the network 12 is performed by exchanging data frames according to a predetermined communication protocol such as BEAN.

The multiplex communication lines 21–23 are connected to the data relay unit 4. The data relay unit 4 relays a data frame sent from one of the networks 11–13 to another one of the networks 11–13. Further, the data relay unit 4 itself sends a data frame to each network 11–13 as a node belonging to the networks 11–13.

Each ECU 311–313, 321–323, 331–333 includes an I/O circuit 3311. When signal inputted to the I/O circuit 3311 corresponding to the ECU 331 changes (an event for data communication occurs in the ECU 331), the ECU 331 forms an event frame according to the type of the event and sends the formed event frame to a destination node via the data relay unit 4 for notifying the occurrence of the event to the destination node. It is to be noted that the ECU 331 sends a wake-up frame to the data relay unit 4 before it sends the event frame. The wake-up frame is a request to send a predetermined response (BUS-A frame, BUS-B frame, or BUS-C frame). When the ECU 331 receives the predetermined response, it sends the event frame.

Figure 2:
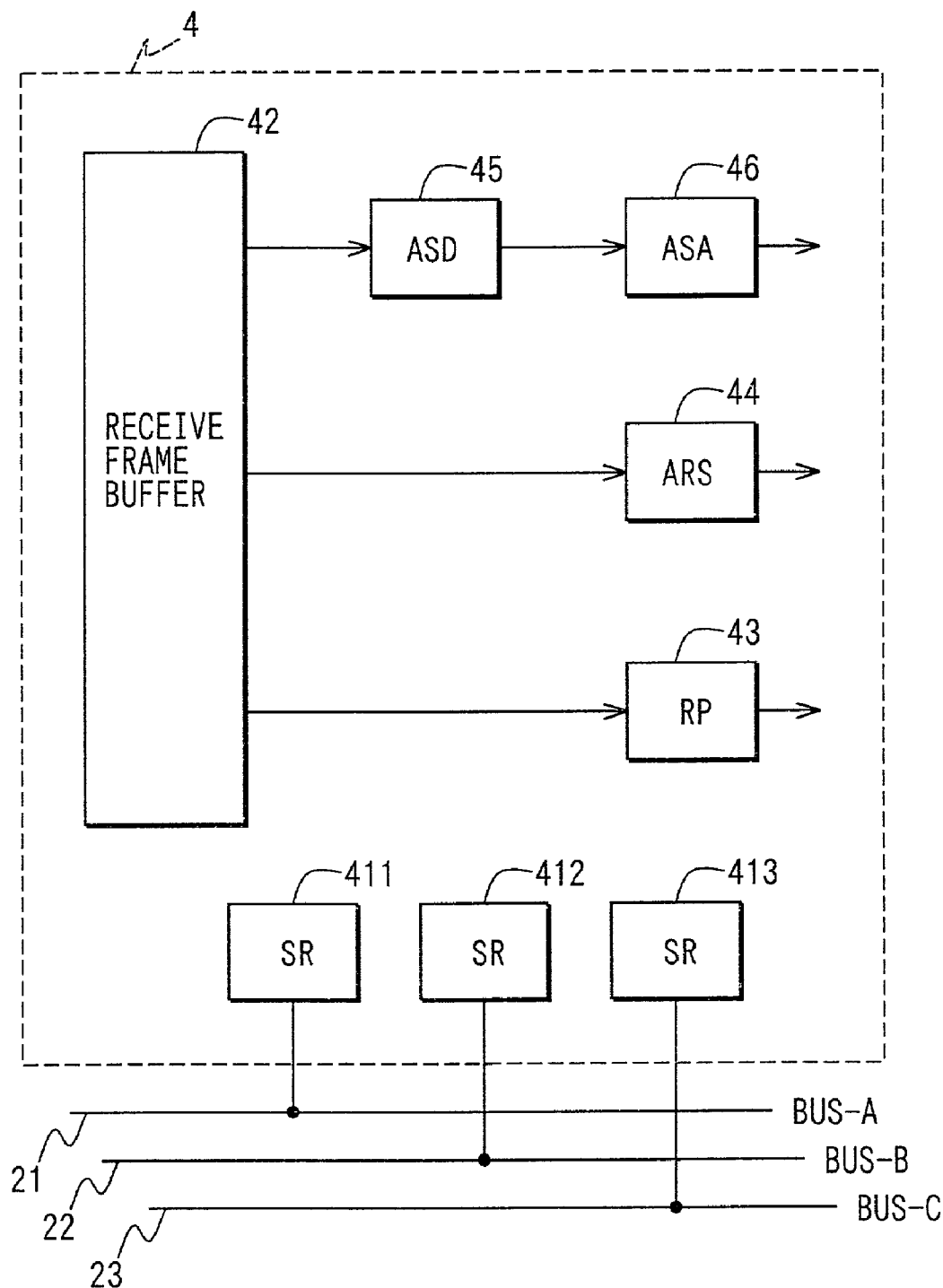
FIG. 2 is a functional block diagram of a data relay unit included in the multiplex communication system according to the first embodiment.

Referring to FIG. 2, the data relay unit 4 is formed with communication LSI, a microcomputer, and the like. The data relay unit 4 includes three frame send/receive (SR) sections 411–413, each of which is connected to the respective communication lines 21–23.

Data frames received by the frame SR sections 411–413 are temporarily stored in a receive frame buffer 42. A predetermined area of a RAM is allocated for the receive frame buffer 42. If a data frame which should be relayed is stored in the receive frame buffer 42, a relay processing (RP) section 43 identifies the frame SR section 411–413 which ought to send the data frame, and outputs the data frame to the identified frame SR sections 411–413. Thereafter, the data frame is sent to the destination node at a time predetermined according to the communication protocols employed by the frame SR section 411–413.

On the other hand, if the stored data frame is a wake-up frame, an activation request sending section (ARS) 44 sends a wake-up frame via all the frame SR sections 411–413 as follows.

In response to the same wake-up frame as the data relay unit 4 receives, each of the other ECUs belonging to the same network to which the sender ECU that sent the wake-up frame belongs sends a wake-up frame. An activation state determination (ASD) section 45 determines whether wake-up frames from the other ECUs are received and stored in the receive frame buffer 42. If the ASD section 45 determines that wake-up frames are received from all of the other ECUs belonging to the same network, an activation state answering (ASA) section 46 sends a network activation notifying (NAN) frame (BUS-A frame, BUS-C frame, or BUS-C frame), which represents that the network is activated, via all the frame SR sections 411–413.

Figure 3:
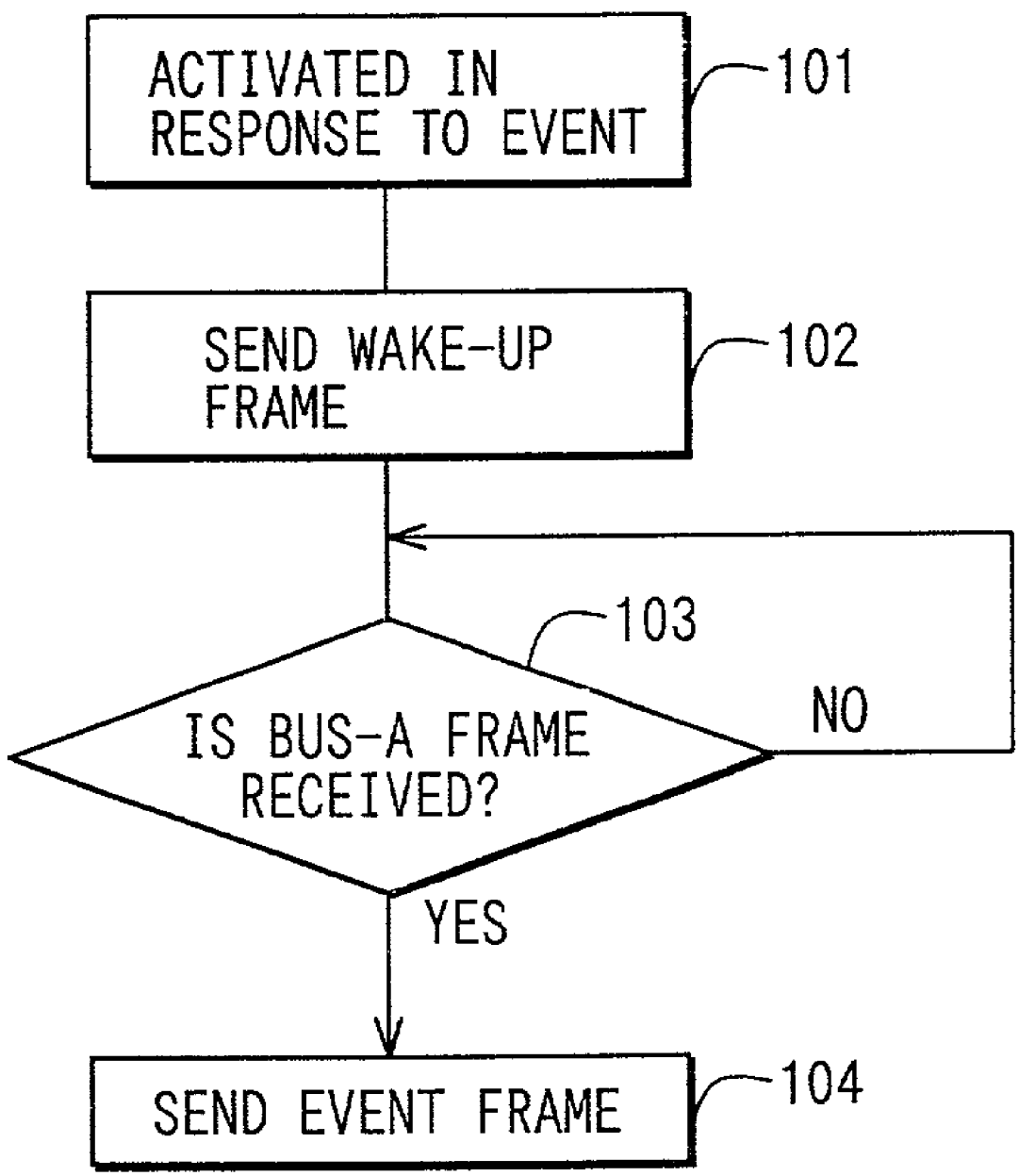
FIG. 3 is a flowchart of the operation of each ECU included in the multiplex communication system.
Figure 4:
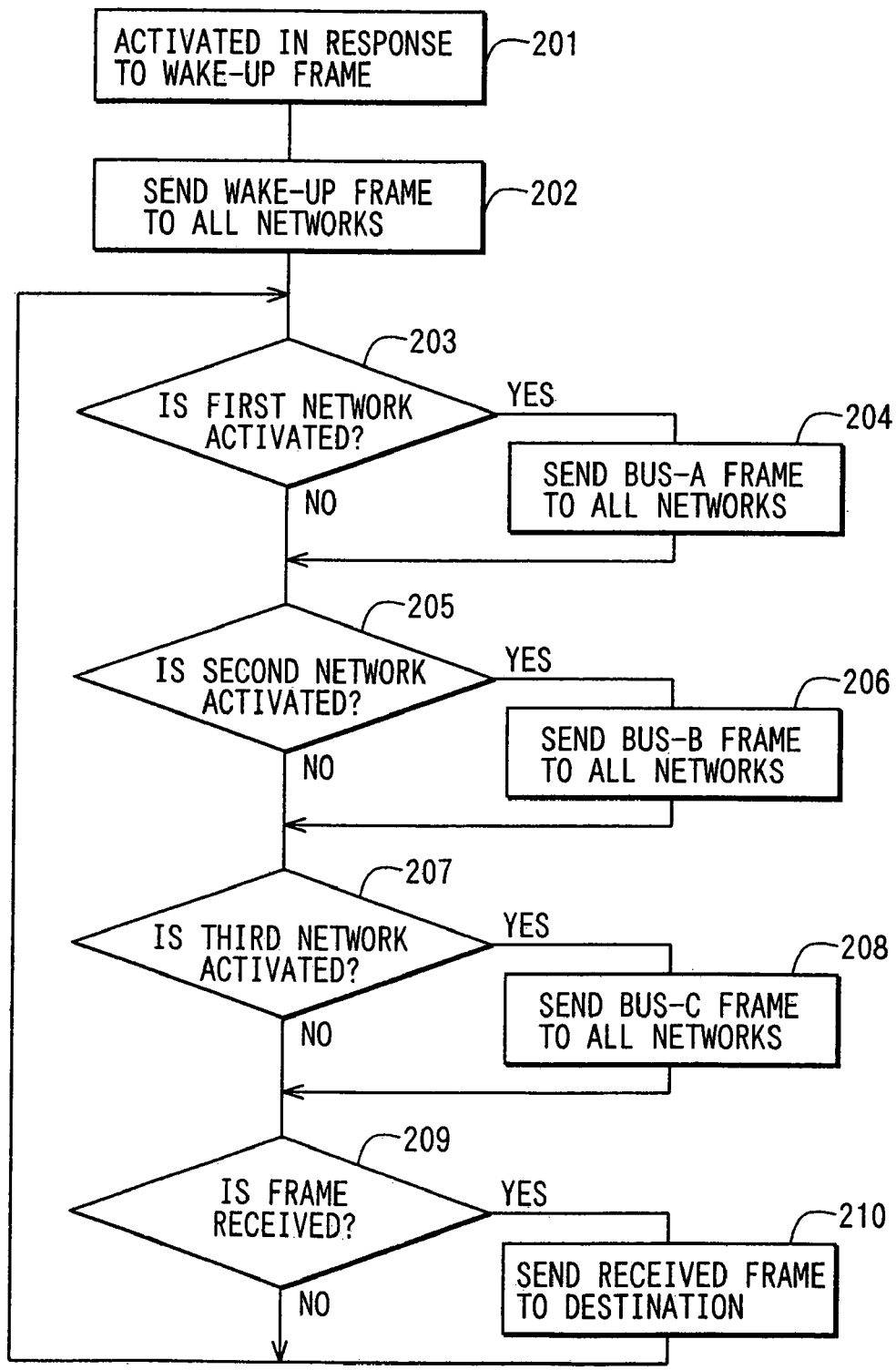
FIG. 4 is a flowchart of the operation of the data relay unit.
Figure 5:
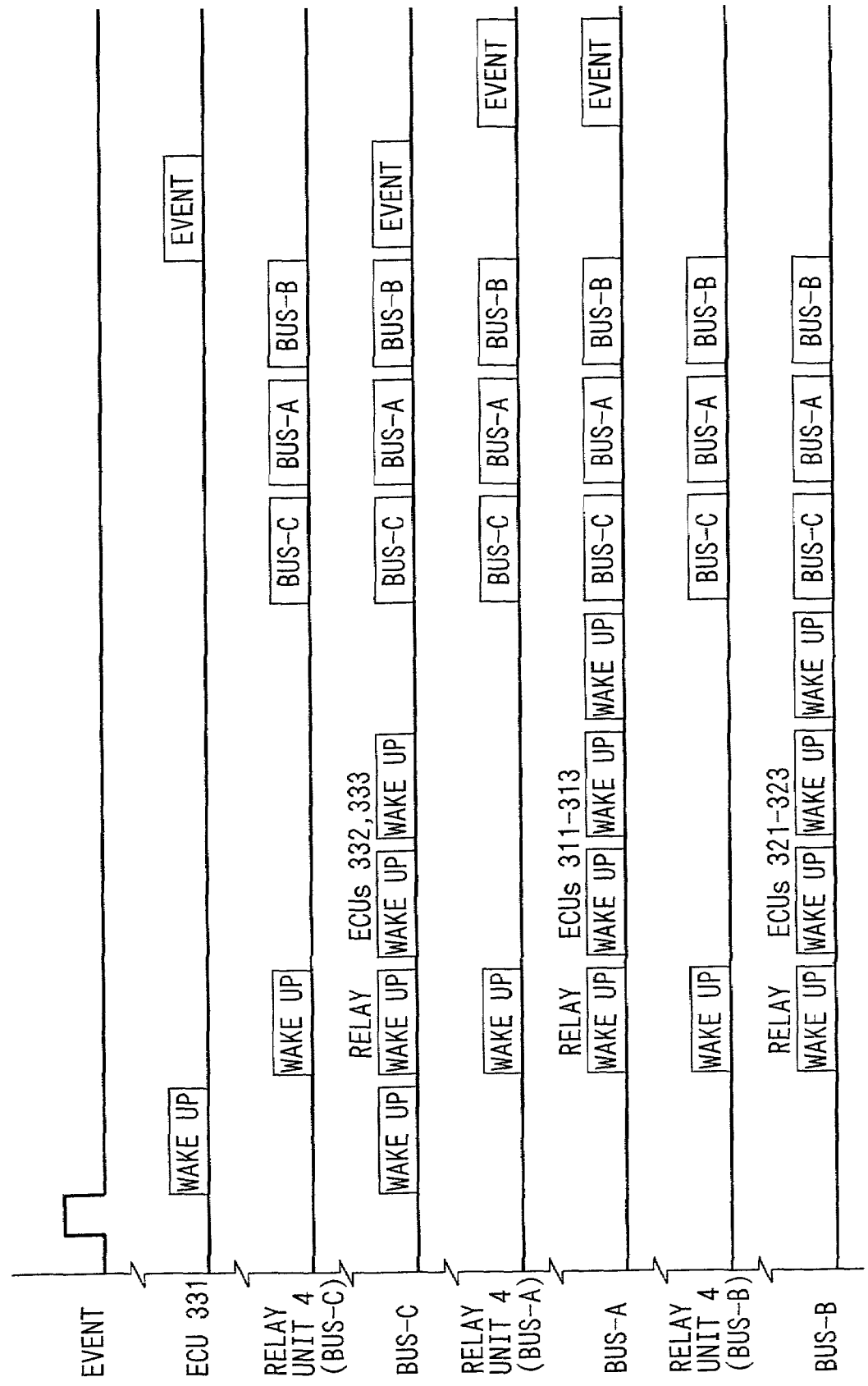
FIG. 5 is a timing chart of the operation of various parts in the multiplex communication system.

Referring to FIGS. 3, 4 and 5, when an event is generated in the I/O circuit 3311 of the ECU 331 which belongs to the third network 13 and the ECU 331 should notify the first network 11 the occurrence of the event, the ECU 331 and the data relay unit 4 operate as follows.

If the ECU 331 is in a sleep mode, it is activated in response to the occurrence of the event at step 101. The ECU 331 sends a wake-up frame (Wake Up in FIG. 5) at step 102. The wake-up frame is received by all of the other nodes belonging to the third network 13. That is, the data relay unit 4, which is a node belonging to all the networks 11–13, also receives the wake-up frame through the communication line 23.

If the data relay unit 4 is in the sleep mode, it is activated in response to the wake-up frame at step 201. The ARS section 44 sends a wake-up frame to the first network 11 and the second network 12 at step 202. Each of the ECUs 311–313 belonging to the first network 11 is activated in response to the wake-up frame from the data relay unit 4, and sends a wake-up frame over the communication line 21. Each of the ECUs 321–323 belonging to the second network 12 is also activated in response to the wake-up frame from the data relay unit 4, and sends a wake-up frame over the communication line 22.

On the other hand, the other ECUs 332, 333 belonging to the third network 23 are also activated in response to the wake-up frame from the ECU 331, and send a wake-up frame over the communication line.

In the data relay unit 4, when the ASD section 45 determines at step 203 that the data relay unit 4 receives wake-up frames from all the ECUs 311–313 belonging to the first network 21, the ASA section 46 sends a BUS-A frame via all the frame SR sections 411–413 at step 204. If it is determined at step 203 that the data relay unit 4 does not receive wake-up frames from all the ECUs 311–313 belonging to the first network 21 yet, step 204 is skipped.

When the ASD section 45 determines at step 205 that the data relay unit 4 receives wake-up frames from all the ECUs 321–323 belonging to the second network 22, the ASA section 46 sends a BUS-B frame via all the frame SR sections 411–413 at step 206. If it is determined at step 205 that the data relay unit 4 does not receive wake-up frames from all the ECUs 321–323 belonging to the second network 22 yet, step 206 is skipped.

At step 207, the ASD section 45 checks whether the data relay unit 4 receives wake-up frames from all the ECUs 331–333 belonging to the third network 23. In this case, it is determined at step 207 whether the wake-up frames from the ECUs 332, 333 are received after the wake-up frame from the ECU 331 is received at step 201. If it is determined that the wake-up frames are received from all the ECUs 331–333 belonging to the third network 23, the ASA section 46 sends a BUS-C frame via all the frame SR section 411–413. If it is determined at step 207 that the data relay unit 4 does not receive wake-up frames from all the ECUs 331–333 yet, step 208 is skipped.

On the other hand, the ECU 331 checks at step 103 whether the BUS-A frame from the data relay unit 4 is received. When it is determined at step 103 that the BUS-A frame is received, the ECU 331 forms and sends an event frame according to a predetermined communication protocol at step 104. The event frame is formed so that the type of the event and the destination nodes are identified by the content of the event frame.

In the data relay unit 4, the RP section 43 checks at step 209 whether a data frame which should be relayed is received. When the event frame from the ECU 331 is received and stored in the receive frame buffer 42, it is determined at step 209 that the data frame which should be relayed is received. Then the event frame is sent to the first network 11 at 210.

The destination node (ECU) belonging to the first network 11 receives the event frame and thereby recognize the occurrence of the event.

In the case that an event occurs in the I/O circuit of the ECU other than the ECU 331 or the ECU 331 should notify the network other than the first network 11 the occurrence of the event, the sender ECU and the data relay unit 4 operates similarly to the present embodiment.

In the case that the ECU 331 should notify a plurality of destination networks 11–13 the occurrence of the event, the ECU 331 sends an event frame after it receives NAN frames regarding all of the destination networks 11–13. Alternatively, the ECU 331 may send the event frame to each of the destination networks 11–13 sequentially in response to the NAN frame regarding the network 11–13.

(Second Embodiment)

Figure 6:
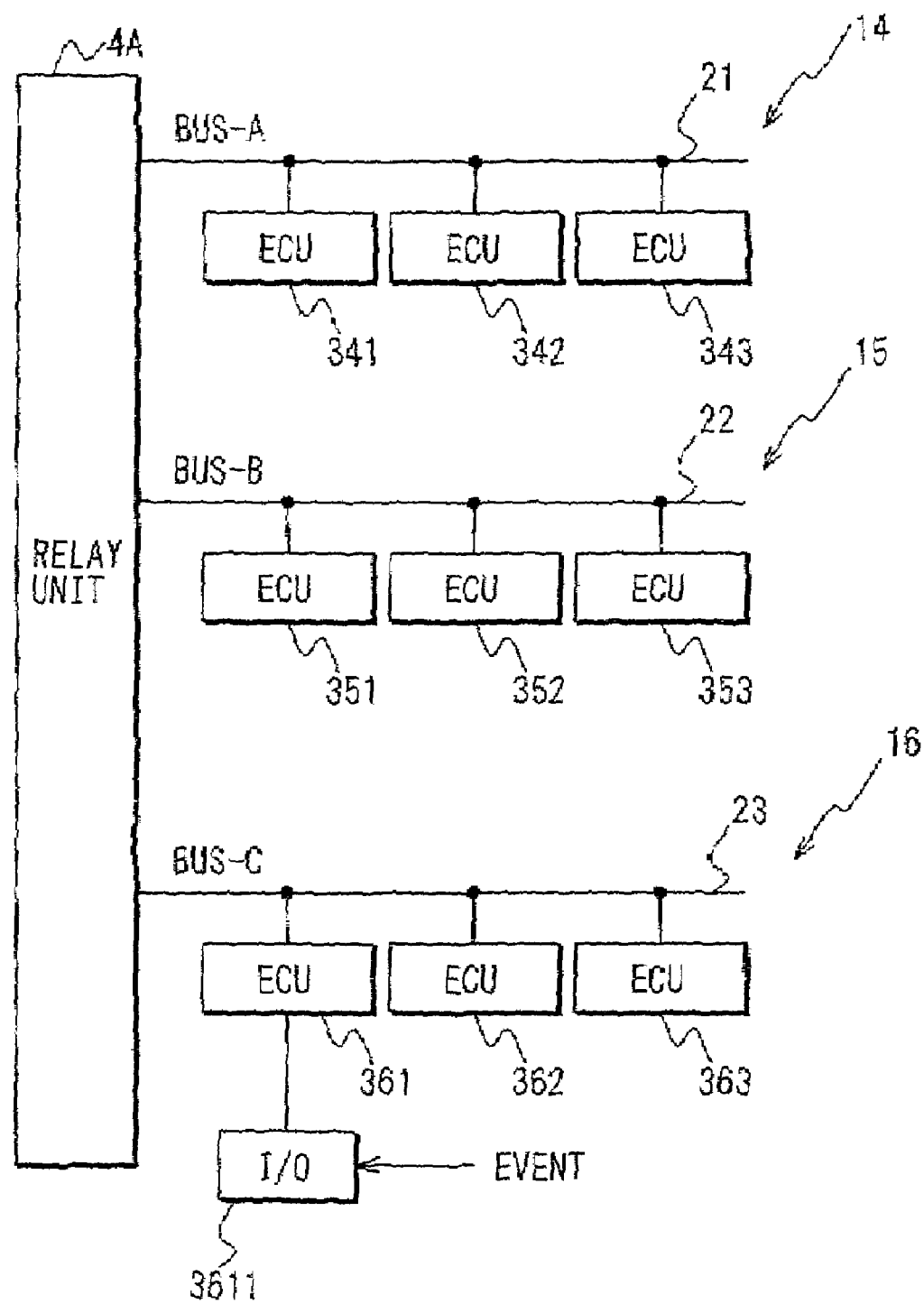
FIG. 6 is a block diagram of a multiplex communication system according to a second embodiment of the present invention.

Referring to FIG. 6, a multiplex communication system includes three networks 14–16 and a data relay unit 4A. Each of the networks 14–16 is formed by connecting at least one node (ECU) 341–343, 351–353, 361–363 to a multiplex communication line 21–23. Each of the ECUs 341–343, 351–353, 361–363 includes an I/O circuit 3611. The data relay unit 4A relays a data frame among the networks 14–16.

When an event occurs in the I/O circuit 3611 of one of the ECUs 341–343, 351–353, 361–363, the ECU (sender ECU) sends a wake-up frame only if the network which includes the sender ECU is in the sleep mode. In response to the wake-up frame, the network is activated so that it can communicate with the data relay unit 4A. Then the sender ECU sends an activation determination request (ADR) frame different from the wake-up frame to the data relay unit 4A. The ADR frame is formed according to a predetermined communication protocol so that it includes a request to send a NAN frame regarding a destination network of an event frame, not regarding all the networks 14–16. The sender ECU waits for the NAN frame.

Figure 7:
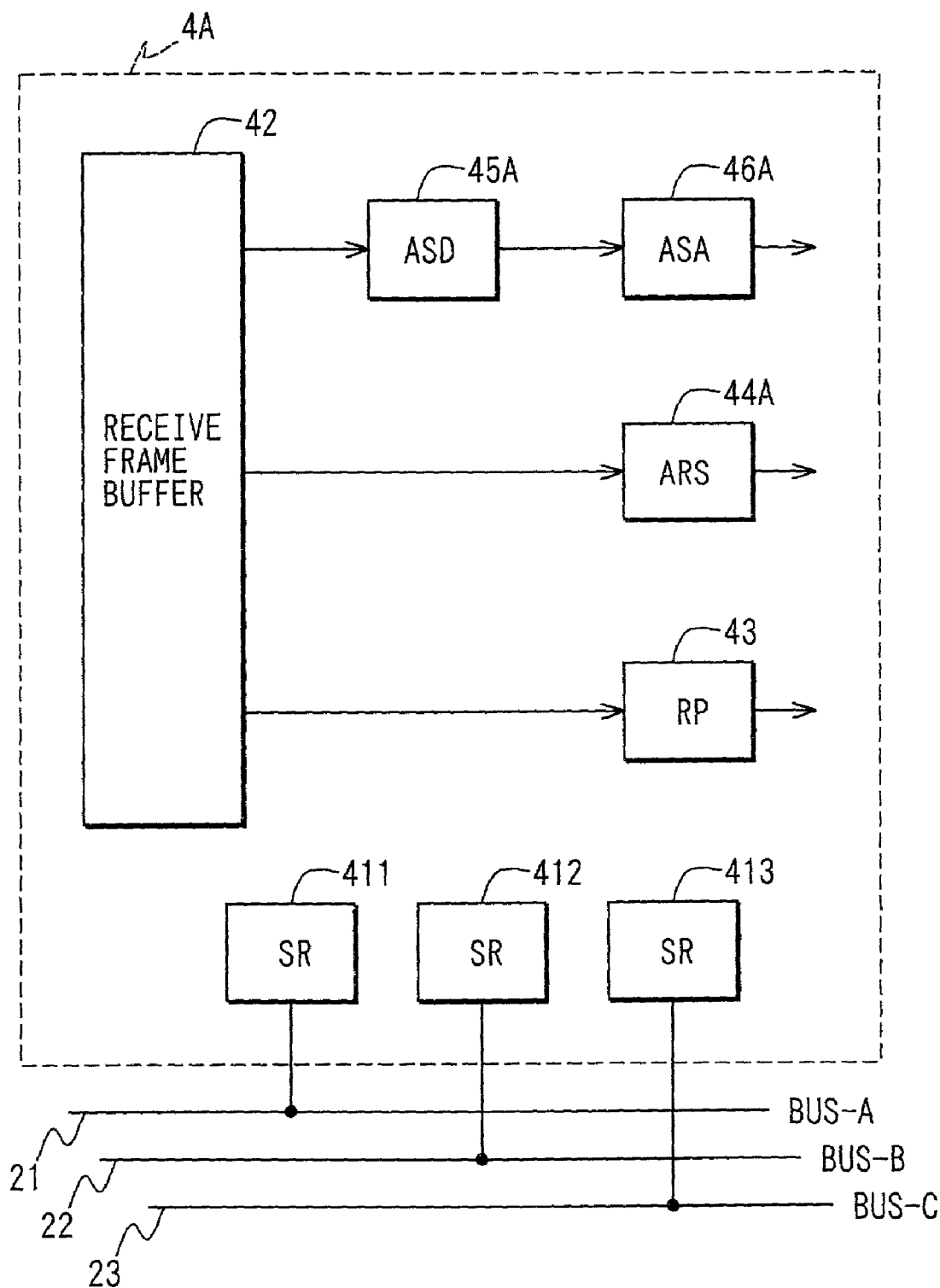
FIG. 7 is a functional block diagram of a data relay unit included in the multiplex communication system according to the second embodiment.

Referring to FIG. 7, the ADR frame is received by the data relay unit 4A and stored in a receive frame buffer 42. An ARS section 44A extracts the request and the destination network from the stored ADR frame, and sends a wake-up frame to the destination network 14–16.

An ASD section 45A checks whether wake-up frames are received from all the ECUs belonging to the destination network 14–16.

When it is determined that the wake-up frames are received from all the ECUs belonging to the destination network 14–16, an ASA section 46A sends the NAN frame (BUS-A frame, BUS-B frame, or BUS-C frame) regarding the destination network 14–16 to the network 14–16 which sent the ADR frame.

In response to the NAN frame, the sender ECU sends an event frame.

(Third Embodiment)

Figure 8:
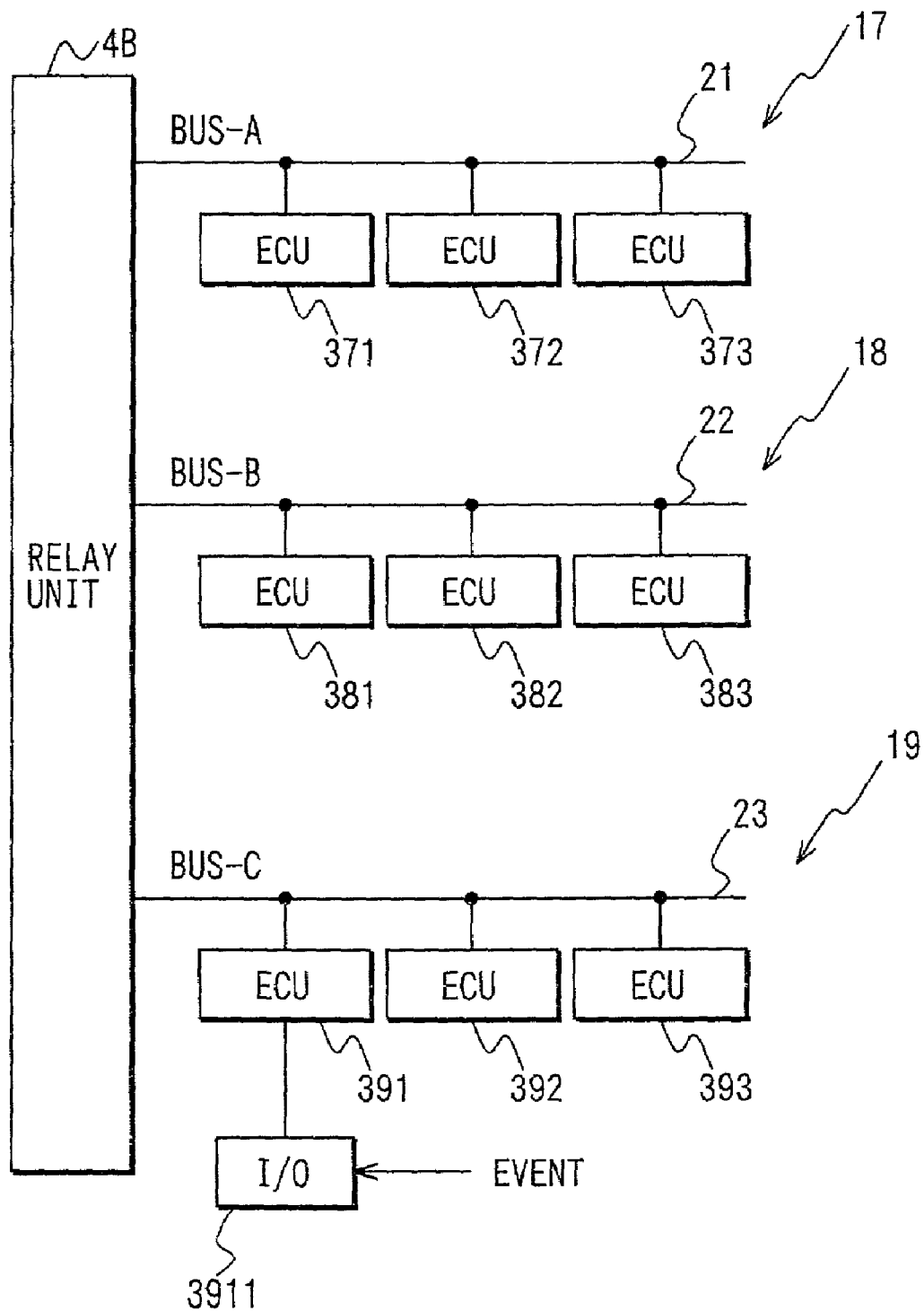
FIG. 8 is a block diagram of a multiplex communication system according to a third embodiment of the present invention.

Referring to FIG. 8, a multiplex communication system includes three networks 17–19 and a data relay unit 4B. Each of the networks 17–19 is formed by connecting at least one node (ECU) 371–373, 381–383, 391–393 to a multiplex communication line 21–23. Each of the ECUs 371–373, 381–383, 391–393 includes an I/O circuit 3911. The data relay unit 4B relays a data frame among the networks 17–19.

If an event occurs in the I/O circuit 3911 of one of the ECUs 371–373, 381–383, 391–393 when the network 17–19 which includes the ECU is in the sleep mode, the ECU (sender ECU) and the data relay unit 4B operate similarly to the first embodiment as follows.

Figure 9:
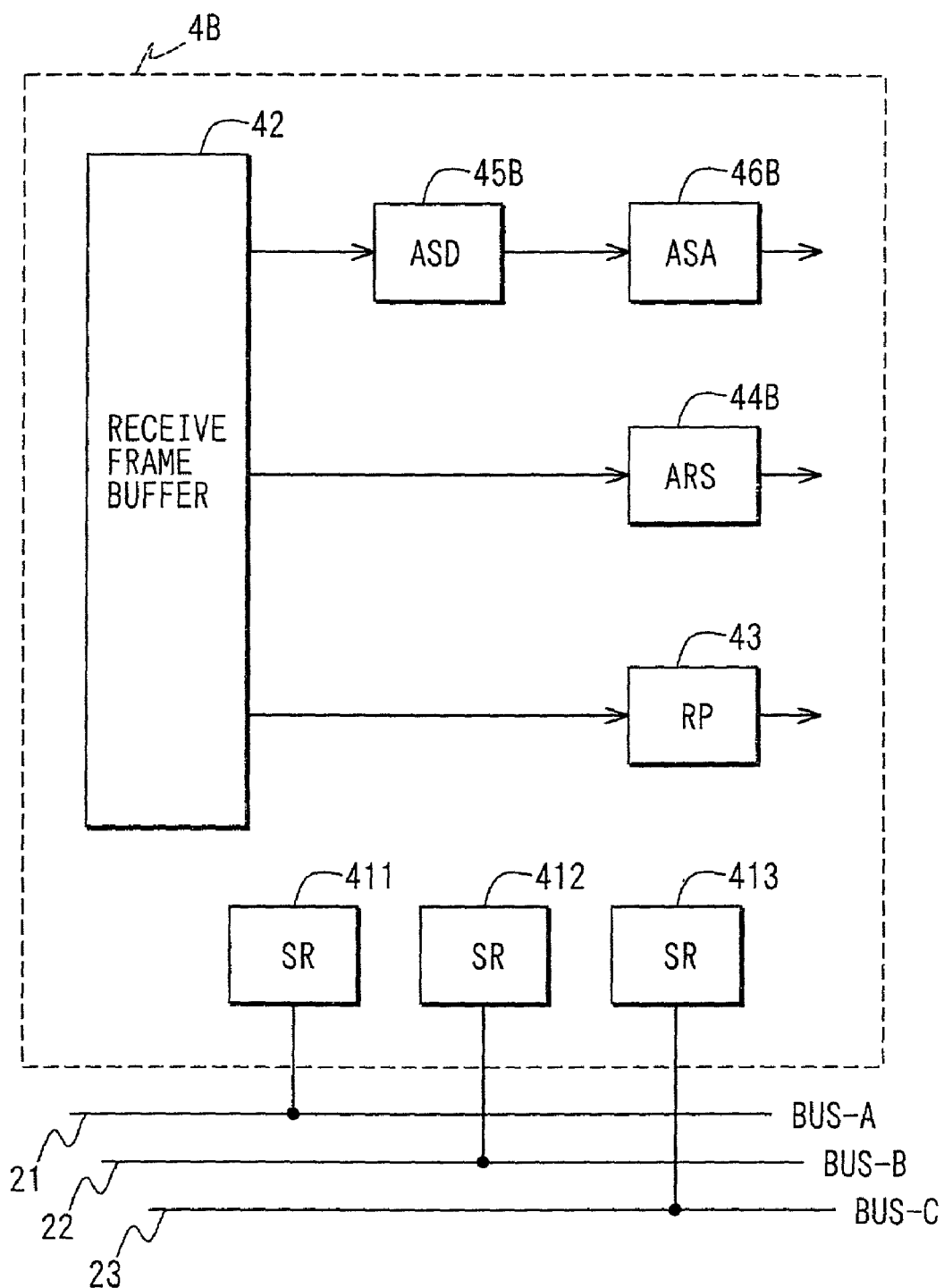
FIG. 9 is a functional block diagram of a data relay unit included in the multiplex communication system according to the third embodiment.

The sender ECU sends a wake-up frame. Referring to FIG. 9, the data relay unit 4 receives the wake-up frame. In response to the wake-up frame, an ARS section 44B sends a wake-up frame to all the networks other than the network which includes the sender ECU. For each of the networks 17–19 including the network which includes the sender ECU, an ASD section 45B checks whether wake-up frames are received from all the ECUs 371–373, 381–383, 391–393 belonging to the network 17–19. When it is determined that wake-up frames are received from all the ECUs 371–373, 381–383, 391–393 belonging to the network 17–19, the ASA section 46B sends a NAN frame (BUS-A frame, BUS-B frame, or BUS-C frame) regarding the network 17–19 to all the networks 17–19. In this way, the NAN frames regarding the respective networks 17–19 are sent sequentially.

When the sender ECU receives the NAN frame regarding the destination network, it sends an event frame.

On the other hand, if an event occurs in the I/O circuit 3911 of one of the ECUs 371–373, 381–383, 391–393 when the network which includes the ECU is activated, the ECU (sender ECU) and the data relay unit 4B operate similarly to the second embodiment as follows.

The ECU sends an ADR frame. In the data relay unit 4, in response to the ADR frame, the ARS section 44B sends a wake-up frame to the destination network. Thereafter the ASD section 45B checks whether wake-up frames are received from all the ECUs belonging to the destination network 17–19. When it is determined that wake-up frames are received from all the ECUs belonging to the destination network 17–19, the ASA section 46B sends a NAN frame (BUS-A frame, BUS-B frame, or BUS-C frame) regarding the destination network 17–19 to the network 17–19 which sent the ADR frame.

In response to the NAN frame regarding the destination network 17–19, the sender ECU sends an event frame.

In the above embodiments, the event frame is sent to the destination node after the destination network 11–19 is activated. Therefore the destination node can certainly receive the event frame. Furthermore, a high-capacity buffer for saving the event frame is not required, and therefore cost is low.

Moreover, the number of data frames exchanged among the nodes 311–313, 321–323, 331–333, 341–343, 351–353, 361–363, 371–373, 381–383, 391–393 including the data relay unit 4, 4A, 4B from the occurrence of the event until the event frame is relayed to the destination node is constant. That is, communication load on the communication lines 11–19 is constant. For example, in the first embodiment, data frames exchanged among the nodes 311–313, 321–323, 331–333, 4 are limited to the data frames shown in FIG. 5. Further the communication load on the communication lines 11–19 does not vary depending on the number of nodes included in the system. Therefore delay, which is time that elapses from the occurrence of the event until the destination node recognizes the occurrence of the event does not vary greatly depending on the state of the system at the moment of the occurrence of the event or the number of the nodes.

In the first embodiment, the sender node sends a wake-up frame which does not include the destination node of the event frame, and recognizes by the response to the wake-up frame that the destination network is activated. Therefore it is not required to add a type of a data frame which includes the destination node of the event frame. Further the data relay unit 4 may always execute the same program in response to the wake-up frame irrespective of occurrence of the event. Accordingly configuration of the data relay unit 4 can be simplified. For example, the capacity of the ROM which stores programs can be reduced.

In the second embodiment, the sender node receives only a NAN frame regarding the destination network 14–16 of the event frame, not the NAN frames regarding all the networks 14–16. Therefore this embodiment is effective in a multiplex communication system which includes many networks.

In the third embodiment, if the event occurs in the sender node when the network which includes the sender node is in the sleep mode, the data relay unit 4B sends the wake-up frame to all the network 17–19 in response to the wake-up frame from the sender node without waiting for an ADR frame. Therefore the delay is reduced in this case. On the other hand, if the event occurs in the sender node when the network which includes the sender node is activated, the data relay unit 4B sends only the NAN frame regarding the destination network 17–19 of the event frame to the sender node. Therefore communication load on the communication lines 17–19 is reduced in this case.

What is claimed is:

1. A multiplex communication system comprising:
   a plurality of networks each of which includes a plurality of nodes;
   a data relay unit for relaying data frames among the networks; and
   communication lines connecting the respective networks and the data relay unit,
   wherein each of the networks shifts into a sleep mode if an event does not occur for a predetermined time therein,
   wherein each of the nodes is for requesting a predetermined response from the data relay unit upon occurrence of an event in the node and is further for sending a notice of the occurrence of the event upon receiving the predetermined response from the data relay unit, and
   wherein the data relay unit comprises:
      activation request sending means for sending to at least a destination network, which includes a destination node for receiving the notice of the occurrence of the event, an activation request for requesting the destination network to be activated when the data relay unit receives a node request for the predetermined response;
      activation state determination means for determining whether the destination network is activated; and
      activation, state answering means for sending, when the destination network is activated the predetermined response to a sender network, the sender network including the node that sends the node request for the predetermined response.

2. A multiplex communication system as in claim 1, wherein:
   each of the nodes is for sending a data frame which includes a request that the sender network is activated; and
   the activation request sending means is for sending the activation request to another of the networks other than the sender network.

3. A multiplex communication system as in claim 1, wherein:
   each of the nodes is for requesting a predetermined response from the data relay unit by sending a data frame which includes a request that the sender network is activated, if the sender network is in the sleep mode when the event occurs; and
   the activation request sending means sends the activation request to another of the networks other than the sender network, if it receives the data frame which includes the request that the sender network is activated.

4. A method for sending an event frame in a multiplex communication system having a plurality of networks and a data relay unit, each network having at least one node, the method comprising:
   sending from a sender node in one of the networks to the data relay unit a request for the data relay unit to send a predetermined response to the sender node, the sender node being a sender of an event frame indicative of occurrence of an event;
   sending from the data relay unit to at least a destination node in another of the networks an activation request for requesting the destination node to be activated, the destination node being a destination of the event frame;
   determining in the data relay unit whether the destination node is activated;
   sending from the data relay unit to the sender node the predetermined response if the destination node is activated; and
   sending the event frame from the sender node to the destination node through the data relay unit after receiving the predetermined response from the data relay unit.

5. A multiplex communication system comprising:
   at least a first network and a second network each including at least one node;
   a data relay unit in communication with both the first network and the second network;

a sender node in the first network for requesting the data relay unit to send a predetermined response to the sender node upon activation of at least a destination node in the second network, and for sending an event frame, which is indicative of an occurrence of an event at the sender node, to the destination node in the second network through the data relay unit when the sender node receives the predetermined response from the data relay unit.

6. The multiplex communication system of claim 5, further comprising one or more additional networks in addition to the first and second networks, wherein
the predetermined response from the data relay unit comprises network activation frames sequentially received from the second network and the one or more additional networks.

7. The multiplex communication system of claim 5, further comprising one or more additional networks in addition to the first and second networks, wherein
the predetermined response from the data relay unit comprises a network activation frame received only from the second network in which the destination node is located.

8. The multiplex communication system of claim 5, wherein
the sender node in the first network is for requesting the data relay unit to send a predetermined response to the sender node upon activation of only a destination node in the second network if the first network is active at the time of the occurrence of the event.

* * * * *